US012777224B2

(12) United States Patent
Sodagar

(10) Patent No.: US 12,777,224 B2
(45) Date of Patent: Oct. 27, 2026

(54) METHOD FOR BANDWIDTH SWITCHING BY CMAF AND DASH CLIENTS USING ADDRESSABLE RESOURCE INDEX TRACKS AND EVENTS

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 45 days.

(21) Appl. No.: 18/342,230

(22) Filed: Jun. 27, 2023

(65) Prior Publication Data

US 2024/0022792 A1 Jan. 18, 2024

Related U.S. Application Data

(60) Provisional application No. 63/388,577, filed on Jul. 12, 2022.

(51) Int. Cl.
*H04N 21/236* (2011.01)
*H04N 19/136* (2014.01)
(Continued)

(52) U.S. Cl.
CPC ....... *H04N 21/4621* (2013.01); *H04N 19/136* (2014.11); *H04N 19/174* (2014.11); *H04N 21/435* (2013.01)

(58) Field of Classification Search
None
See application file for complete search history.

(56) References Cited

U.S. PATENT DOCUMENTS

2003/0050919 A1* 3/2003 Brown ................ G06F 21/6218
2018/0288500 A1* 10/2018 Stockhammer .... H04N 21/8456
(Continued)

FOREIGN PATENT DOCUMENTS

JP 2011-234370 A 11/2011
JP 2022-030209 A 2/2022

OTHER PUBLICATIONS

International Search Report and Written Opinion in International Patent Application No. PCT/US23/27077 dated Sep. 29, 2023, 11 pages.

(Continued)

*Primary Examiner* — Brian T Pendleton
*Assistant Examiner* — Jean D Saint Cyr
(74) *Attorney, Agent, or Firm* — Crowell & Moring LLP

(57) ABSTRACT

Methods, apparatus, and computer readable storage medium for processing a media stream. The media stream may follow a DASH or CMAF standard. The method may include receiving media stream data comprising: a plurality of media chunks including a first media chunk and a second media chunk; and Addressable Resource Index (ARI) information associated with the first media chunk; determining track switching information based on the ARI information; determining, based on the track switching information, a switch to a different media track at the second media chunk is needed; and receiving the first media chunk and the second media chunk via respective media track, wherein each of the first media chunk and the second media chunk is delivered to the streaming client device with a delivery delay that is no more than one chunk.

18 Claims, 11 Drawing Sheets

(51) Int. Cl.

| | |
|---|---|
| ***H04N 19/174*** | (2014.01) |
| ***H04N 21/2385*** | (2011.01) |
| ***H04N 21/2387*** | (2011.01) |
| ***H04N 21/24*** | (2011.01) |
| ***H04N 21/262*** | (2011.01) |
| ***H04N 21/435*** | (2011.01) |
| ***H04N 21/442*** | (2011.01) |
| ***H04N 21/458*** | (2011.01) |
| ***H04N 21/462*** | (2011.01) |
| ***H04N 21/647*** | (2011.01) |

(56) References Cited

U.S. PATENT DOCUMENTS

| | | | | |
|---|---|---|---|---|
| 2019/0075149 | A1 | 3/2019 | Lu et al. | |
| 2020/0304554 | A1* | 9/2020 | Stockhammer | H04L 65/612 |
| 2021/0400100 | A1 | 12/2021 | Sodagar | |
| 2022/0007086 | A1* | 1/2022 | Stockhammer | H04N 21/235 |
| 2022/0337640 | A1* | 10/2022 | Sodagar | H04L 67/02 |
| 2023/0224532 | A1* | 7/2023 | Stockhammer | H04N 19/154 386/353 |

OTHER PUBLICATIONS

Yadav et al., "Playing Chunk-Transferred DASH Segments at Low Latency with Qlive," MMSys '21: Proceedings of the 12th ACM Multimedia Systems Conference Jun. 2021, https://dl.acm.org/doi/pdf/10.1145/3458305.3463376, published Jul. 15, 2021, pp. 51-64.

"Information technology—Dynamic adaptive streaming over HTTP (DASH)—Part 1: Media presentation description and segment formats", ISO/IEC 23009-1:2022(E), Final Draft International Standard, 327 pages.

"Potential Improvements of ISO/IEC 23009-1 4th edition DAM 2 PrePeriod, nonlinear playback and other extensions", Output document, ISO/IEC JTC 1/SC 29/WG03 MPEG Systems, Convenorship: KATS, May 6, 2022, 47 pages.

"Technologies under Consideration for Dynamic Adaptive Streaming over HTTP 23009, Parts 1, 3, 5, 6, and 8", Output Document, ISO/IEC JTC 1/SC 29/WG 03, MPEG Systems, Convensorship: KATS, Apr. 29, 2022, 110 pages.

Japanese-language Office Action issued in Japanese Application No. 2024-547119 dated Aug. 21, 2025, with English translation (11 pages).

Information technology—Dynamic adaptive streaming over HTTP (DASH)—Part 1: Media presentation description and segment formats—Amendment 1: Preroll, nonlinear playback and other extensions, ISO document (SC29) Draft Amendment ISO/IEC 23009-1:2022 / DAM1, USA, ISO/IEC, Mar. 29, 2022, P18-23 (12 pages).

Takiguchi, Tohru et al.; Low Latency Delivery of Event Data for Net Video for Broadcast Communication Linkage Systems, FIT2020 The 19th Information Science and Technology Forum Lecture Papers, Society of Electronics, Information and Communication Engineers, Japan, Mar. 18, 2008, Apr. 2020 Part 4 P97-98, with English translation (7 pages).

Extended European Search Report issued in European Patent No. 23840150.9 dated Jun. 4, 2025, 11 pages.

Sodagar, Iraj, "[DASH] [DAM1] Addressable Resource Index Events", International Organisation for Standardisation Organisation Internationale De Normalisation ISO/IEC JTC 1/SC 29/WG 3 Coding of Moving Pictures and Audio, m59636, Apr. 2022, 4 pages.

* cited by examiner

METHOD FOR BANDWIDTH SWITCHING BY CMAF AND DASH CLIENTS USING ADDRESSABLE RESOURCE INDEX TRACKS AND EVENTS

INCORPORATION BY REFERENCE

This application is based on and claims the benefit of priority to U.S. Provisional Application No. 63/388,577 filed Jul. 12, 2022, which is herein incorporated by reference in its entirety.

TECHNICAL FIELD

This disclosure generally relates to media streaming technologies including Dynamic Adaptive Streaming over Hypertext transfer protocol (DASH) and Common Media Application Format (CMAF). More specifically, the disclosed technology involves methods and apparatuses for switching bandwidth (or media track) based on information provided in Addressable Resource Index (ARI) tracks and/or ARI events.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Moving picture expert group (MPEG) dynamic adaptive streaming over hypertext transfer protocol (DASH) provides a standard for streaming multimedia content over IP networks. In the DASH standard, a media presentation description (MPD) is used to provide information for a DASH client to adaptively stream media content by downloading media segments from a DASH server. The DASH standard allows the streaming of multi-rate content. One aspect of the DASH standard includes carriage of MPD events and inband events, and a client processing model for these handling these events.

Common Media Application Format (CMAF) is a standard for packaging and delivering various forms of Hypertext transfer protocol (HTTP) based media. This standard simplifies the delivery of media to playback devices by working with, for example, the HTTP Live Streaming (HLS), and DASH protocols to package data under a uniform transport container file. It also employs chunked encoding and chunked transfer encoding to lower latency. This leads to lower costs as a result of reduced storage needs.

SUMMARY

Aspects of the disclosure provide methods and apparatuses for media stream processing and more specifically, for switching bandwidth (or media track) based on information provided in ARI tracks and/or ARI events. In some example implementations, a method for processing a media stream is disclosed. The media stream may include at least two media tracks and following a Dynamic Adaptive Streaming over HTTP (DASH) standard or a Common Media Application Format (CMAF). The method may be performed by, for example, a streaming client device and may include receiving media stream data comprising: a plurality of media chunks including a first media chunk and a second media chunk; and Addressable Resource Index (ARI) information associated with the first media chunk; determining track switching information based on the ARI information; determining, based on the track switching information, a switch to a different media track at the second media chunk is needed; and receiving the first media chunk and the second media chunk via respective media track. In some implementations, each of the first media chunk and the second media chunk is delivered to the streaming client device with a delivery delay that is no more than one chunk.

In some example implementations, another method for processing a media stream is disclosed. the media stream comprising at least two media tracks and following a Dynamic Adaptive Streaming over HTTP (DASH) standard or a Common Media Application Format (CMAF), perform by a streaming client, the method comprising: receiving one of: an Addressable Resource Index (ARI) sample from an ARI track associated with a first media slice that is in a first media track of the media stream; or an ARI event associated with the media stream embedded in the first media slice that is in the first media track of the media stream; wherein the ARI event provides characteristic information for at least one of: the first media slice in the first media track; and first parallel media slices that are in other media tracks of the media stream and are aligned with the first media slice; or a second media slice that is in the first media track and follows the first media slice; and second parallel media slices that are in the other media tracks of the media stream and are time aligned with the second media slice; and determining, based on the characteristic information, a switch to one of the other media tracks being needed.

Aspects of the disclosure also provide a media stream processing device or apparatus including a circuitry configured to carry out any of the method implementations above.

Aspects of the disclosure also provide non-transitory computer-readable mediums storing instructions which when executed by a computer for video decoding and/or encoding cause the computer to perform the methods for media stream processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
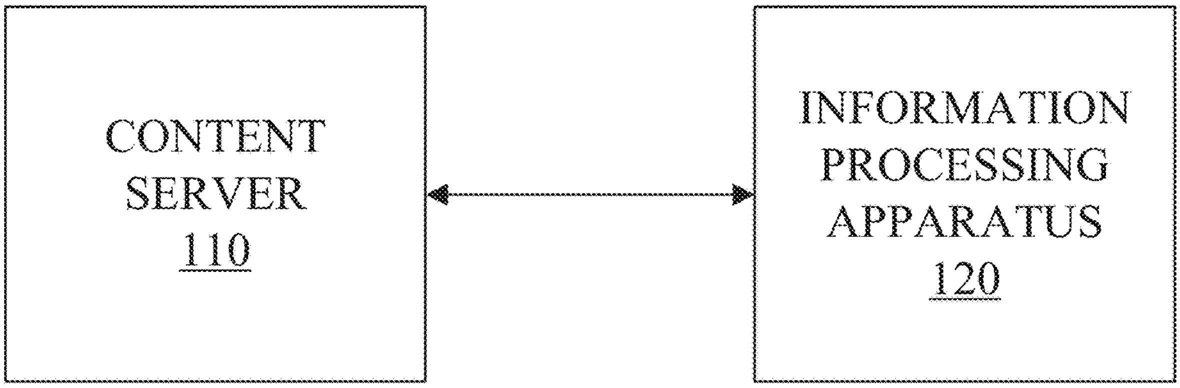
FIG. 1 illustrates a system according to an embodiment of the present disclosure.

Dynamic Adaptive Streaming Over Hypertext Transfer Protocol (DASH) and Media Presentation Description (MPD)

One popular format for media streaming include Dynamic adaptive streaming over hypertext transfer protocol (DASH), as defined in ISO/IEC 23009-1. DASH is an adaptive bitrate streaming technique that enables streaming of media content using hypertext transfer protocol (HTTP) infrastructures, such as web servers, content delivery networks (CDNs), various proxies and caches, and the like. DASH supports both on-demand and live streaming from a DASH server to a DASH client, and allows the DASH client to control a streaming session, so that the DASH server does not need to cope with an additional load of stream adaptation management in large scale deployments. DASH also allows the DASH client a choice of streaming from various DASH servers, and therefore achieving further load-balancing of the network for the benefit of the DASH client. DASH provides dynamic switching between different media tracks, for example, by varying bit-rates to adapt to network conditions.

In DASH, a media presentation description (MPD) file provides information for the DASH client to adaptively stream media content by downloading media segments from the DASH server. The MPD may be in the form of an Extensible Markup Language (XML) document. The MPD file can be fragmented and delivered in parts to reduce session start-up delay. The MPD file can be also updated during the streaming session. In some examples, the MPD file supports expression of content accessibility features, ratings, and camera views. DASH also supports delivering of multi-view and scalable coded content.

The MPD file can contain a sequence of one or more periods. Each of the one or more periods can be defined by, for example, a period element in the MPD file. The MPD file can include an availableStartTime attribute for the MPD and a start attribute for each period. For media presentations with a dynamic type (e.g., used for live services), a sum of the start attribute of the period and the MPD attribute availableStartTime and the duration of the media segment can indicate the availability time of the period in coordinated universal time (UTC) format, in particular the first media segment of each representation in the corresponding period. For media presentations with a static type (e.g., used for on-demand services), the start attribute of the first period can be 0. For any other period, the start attribute can specify a time offset between the start time of the corresponding period relative to the start time of the first period. Each period can extend until the start of the next period, or until the end of the media presentation in the case of the last period. Period start times can be precise and reflect the actual timing resulting from playing the media of all prior periods. In example implementations, the MPD is offered such that a next period is a continuation of content in a previous period, possibly the immediately following period or in a later period (e.g., after an advertisement period has been inserted).

Each period can contain one or more adaptations sets, and each of the adaptation sets can contain one or more representations for the same media content. A representation can be one of a number of alternative encoded versions of audio or video data. The representations can differ by encoding types, e.g., by bitrate, resolution, and/or codec for video data and bitrate, and/or codec for audio data. The term representation can be used to refer to a section of encoded audio or video data corresponding to a particular period of the multimedia content and encoded in a particular way.

Adaptation sets of a particular period can be assigned to a group indicated by a group attribute in the MPD file. Adaptation sets in the same group are generally considered alternatives to each other. For example, each adaptation set of video data for a particular period can be assigned to the same group, such that any adaptation set can be selected for decoding to display video data of the multimedia content for the corresponding period. The media content within one period can be represented by either one adaptation set from group 0, if present, or the combination of at most one adaptation set from each non-zero group, in some examples. Timing data for each representation of a period can be expressed relative to the start time of the period.

A representation can include one or more segments. Each representation can include an initialization segment, or each segment of a representation can be self-initializing. When present, the initialization segment can contain initialization information for accessing the representation. In some cases, the initialization segment does not contain media data. A segment can be uniquely referenced by an identifier, such as a uniform resource locator (URL), uniform resource name (URN), or uniform resource identifier (URI).

In example implementations, a URL can be defined as an <absolute-URI> according to IETF RFC 3986, for example, with a fixed scheme of "http" or "https", possibly restricted by a byte range if a range attribute is provided together with the URL. The byte range can be expressed as byte-range-spec as defined in IETF RFC 2616, for example. It can be restricted to a single expression identifying a contiguous range of bytes. In an embodiment, the segment can be included in the MPD with a data URL, for example as defined in IETF RFC 2397.

The MPD file can provide the identifiers for each segment. In some examples, the MPD file can also provide byte ranges in the form of a range attribute, which can correspond to the data for a segment within a file accessible by the URL, URN, or URI.

Sub-representations can be embedded (or contained) in regular representations and described by a sub-representation element (e.g., SubRepresentation). The sub-representation element can describe properties of one or several media content components that are embedded in the representation. For example, the sub-representation element can describe properties of an embedded audio component (e.g., codec, sampling rate, etc.), an embedded sub-title (e.g., codec), or the sub-representation element can describe some embedded lower quality video layer (e.g., some lower frame rate, etc.). Sub-representation and representation elements can share some common attributes and elements.

Each representation can also include one or more media components, where each media component can correspond to an encoded version of one individual media type, such as audio, video, or timed text (e.g., for closed captioning).

Media components can be time-continuous across boundaries of consecutive media segments within one representation.

In some example implementations, the DASH client can access and download the MPD file from the DASH server. That is, the DASH client can retrieve the MPD file for use in initiating a live session. Based on the MPD file, and for each selected representation, the DASH client can make several decisions, including determining what is the latest segment that is available on the server, determining the segment availability start time of the next segment and possibly future segments, determining when to start playout of the segment and from which timeline in the segment, and determining when to get/fetch a new MPD file. Once the service is played out, the client can keep track of drift between the live service and its own playout, which needs to be detected and compensated.

Common Media Application Format (CMAF)

The Common Media Application Format (CMAF) for segmented media is an extensible standard for the encoding and packaging of segmented media objects for delivery and decoding on end user devices in adaptive multimedia presentations. The CMAF specification defines several logical media objects which are described below.

A CMAF track may contain encoded media samples, including audio, video, and subtitles. Media samples are stored in a CMAF specified container derived from the ISO Base Media File Format (ISO_BMFF). Media samples may optionally be protected by MPEG Common Encryption. A track may include a CMAF Header and one or more CMAF Fragments.

A CMAF switching set may contain alternative tracks that can be switched and spliced at CMAF fragment boundaries to adaptively stream the same content at different bit rates and resolutions. Aligned CMAF Switching Set are two or more CMAF Switching Sets encoded from the same source with alternative encodings, for example, different codecs, and time aligned to each other.

A CMAF selection set is a group of switching sets of the same media type that may include alternative content (e.g., different languages) or alternative encodings (e.g., different codecs).

A CMAF presentation may include one or more presentation time synchronized selection sets.

CMAF supports Addressable Objects such that media content may be delivered to different platforms. CMAF Addressable Objects may include:

- CMAF Header: Headers contain information that includes information for initializing a track.
- CMAF Segment: A sequence of one or more consecutive fragments from the same track.
- CMAF Chunk: A chunk contains a sequential subset of samples from a fragment.
- CMAF Track File: A complete track in one ISO_BMFF file.

DASH and CMAF Event

In DASH and CMAF, an event provides a means for signaling additional information to a DASH/CMAF client and its associated application(s). In example implementations, events are timed and therefore have a start time and duration. The event information may include metadata that describes content of the media presentation. Additionally or alternatively, the event information may include control messages for a media player that are associated with specific times during playback of the media presentation, such as advertisement insertion cues. The event may be implemented as, for example, MPD event, or inband event. They can be a part of the manifest file (e.g., MPD) or be embedded in an IS OBMFF-based media files, such as an event message (emsg) box.

Media presentation description (MPD) events are events that can be signaled in the MPD. A sequence of events assigned to a media presentation time can be provided in the MPD on a period level. Events of the same type can be specified by an event stream element (e.g., EventStream) in a period element. Events terminate at the end of a period even if the start time is after the period boundary or duration of the event extends beyond the period boundary. The event stream element includes message scheme identification information (e.g., @schemeIdUri) and an optional value for the event stream element (e.g., @value). Further, as the event stream contains timed events, a time scale attribute (e.g., @timescale) may be provided to assign events to a specific media presentation time within the period. The timed events themselves can be described by an event element included in the event stream element.

Inband event streams can be multiplexed with representations by adding event messages as part of media segments. The event streams may be present in selected representations, in one or several selected adaptation sets only, or in all representations. For example, one possible configuration is one where only the audio adaptation sets contain inband events, or only the video adaptation sets contain inband events. An inband event stream that is present in a representation can be indicated by an inband event stream element (e.g., InbandEventStream) on various levels, such as an adaptation set level, or a representation level. Further, one representation can contain multiple inband event streams, which are each indicated by a separate inband event stream elements.

FIG. 1 illustrates a system (100) according to an embodiment of the present disclosure. The system (100) includes a content server (110) and an information processing apparatus (120). The content server (110) can provide a content stream, including primary content (e.g., a main program) and one or more timed metadata tracks.

The information processing apparatus (120) can interface with the content server (110). For example, the information processing apparatus (120) can play back content received from the content server (110). The playback of the content can be performed based on a manifest file (e.g., an MPD) received by the information processing apparatus (120) (e.g., from the content server (110)). The manifest file can further include signaling for the one or more timed metadata tracks.

Figure 2:
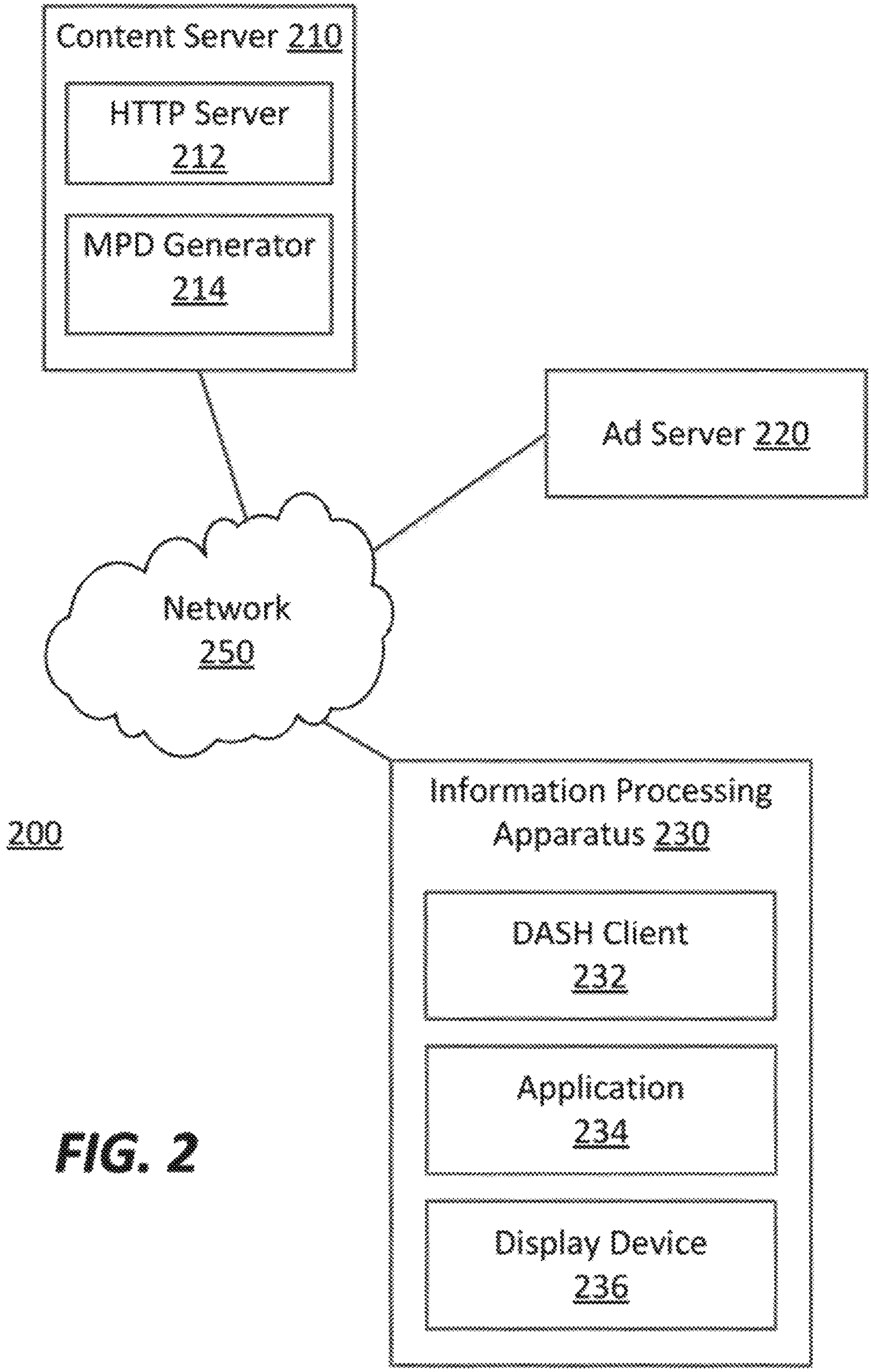
FIG. 2 illustrates a Dynamic Adaptive Streaming over HTTP (DASH) system according to an embodiment of the present disclosure.

An exemplary DASH/CMAF system is illustrated in FIG. 2. The DASH system (200) can include a content server (210), an advertisement server (220), and an information processing apparatus (230) which are connected to a network (250). The DASH system (200) can also include one or more supplemental content servers.

The content server (210) can provide primary content (e.g., a main program) and a manifest file (e.g., an MPD), to the information processing apparatus (230). The manifest file can be generated by the MPD generator (214) for example. The primary content and the manifest file can be provided by different servers in other embodiments.

The information processing apparatus (230) receives the MPD and can acquire primary content from an HTTP server (212) of the content server (210) based on the MPD. The MPD can be processed by a DASH client (232) executed on the information processing apparatus (230). Further, the DASH client (232) can acquire advertisement content from the advertisement server (220), or other content (e.g., interactive content) from one or more supplemental content servers. The main content and the advertisement content can be processed by the DASH client (232) and output for display on a display device (236). The display device (236) can be integrated in, or external to, the information processing apparatus (230). Further, the DASH client (232) can extract event information from one or more timed metadata tracks and send the extracted event information to an application (234) for further processing. The application (234) can be configured, for example, to display supplemental content based on the event information.

The advertisement server (220) can store advertisement content in advertisement storage, such as a memory. The information processing apparatus (230) can request the stored advertisement content based on the event information.

Figure 3:
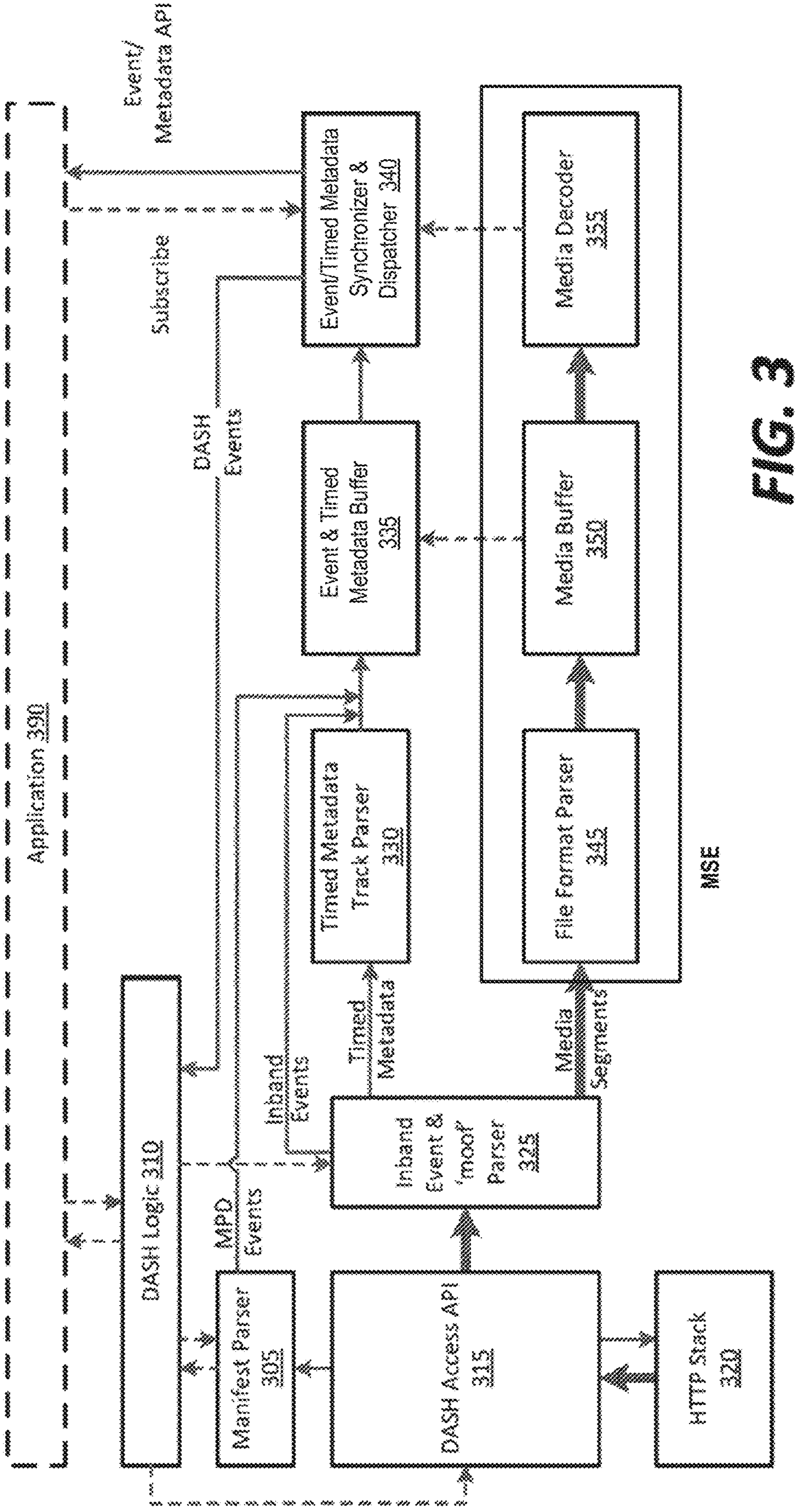
FIG. 3 illustrates a DASH client architecture according to an embodiment of the present disclosure.

FIG. 3 illustrates an example DASH/CMAF client architecture for processing DASH and CMAF events according to an embodiment of the present disclosure. The DASH/CMAF client (or DASH/CMAF player) can be configured to communicate with an application (390) and process various types of events, including (i) MPD events, (ii) inband events, and (iii) timed metadata events.

A manifest parser (305) parses a manifest (e.g., an MPD). The manifest is provided by the content server (110, 210), for example. The manifest parser (305) extracts event information about MPD events, inband events, and timed metadata events embedded in timed metadata tracks. The extracted event information can be provided to DASH logic (310) (e.g., DASH player control, selection, and heuristic logic). The DASH logic (310) can notify an application (390) of event schemes signaled in the manifest based on the event information.

The event information can include event scheme information for distinguishing between different event streams. The application (390) can use the event scheme information to subscribe to event schemes of interest. The application (390) can further indicate a desired dispatch mode for each of the subscribed schemes through one or more subscription APIs. For example, the application (390) can send a subscription request to the DASH client that identifies one or more event schemes of interest and any desired corresponding dispatch modes.

If the application (390) subscribes to one or more event schemes that are delivered as part of one or more timed metadata tracks, an inband event and 'moot' parser (325) can stream the one or more timed metadata tracks to a timed metadata track parser (330). For example, the inband event and 'moot' parser (325) parses a movie fragment box ("moof") and subsequently parses the timed metadata track based on control information from the DASH logic (310).

The timed metadata track parser (330) can extract event messages embedded in the timed metadata track. The extracted event messages can be stored in an event and timed metadata buffer (335). A synchronizer/dispatcher module (340) (e.g., event and timed metadata synchronizer and dispatcher) can dispatch (or send) the subscribed events to the application (390).

MPD events described in the MPD can be parsed by the manifest parser (305) and stored in the buffer (335). For example, the manifest parser (305) parses each event stream element of the MPD, and parses each event described in each event stream element. For each event signaled in the MPD, event information such as presentation time and event duration can be stored in the buffer (335) in association with the event.

The inband event and 'moot' parser (325) can parse media segments to extract inband event messages. Any such identified inband events and associated presentation times and durations can be stored in the buffer (335).

Accordingly, the buffer (335) can store therein MPD events, inband events, and/or timed metadata events. The buffer (335) can be a First-In-First-Out (FIFO) buffer, for example. The buffer (335) can be managed in correspondence with a media buffer (350). For example, as long as a media segment exists in the media buffer (350), any events or timed metadata corresponding to that media segment can be stored in the buffer (335).

A DASH Access Application Programming Interface (API) (315) can manage the fetching and reception of a content stream (or dataflow) including media content and various metadata through an HTTP protocol stack (320). The DASH Access API (315) can separate the received content stream into different dataflows. The dataflow provided to the inband event and moof parser can include media segments, one or more timed metadata tracks, and inband event signaling included in the media segments. In an embodiment, the dataflow provided to the manifest parser 305 can include an MPD.

The DASH Access API (315) can forward the manifest to the manifest parser (305). Beyond describing events, the manifest can also provide information on media segments to the DASH logic (310), which can communicate with the application (390) and the inband event and moof parser (325). The application (390) can be associated with the media content processed by the DASH client. Control/synchronization signals exchanged among the application (390), the DASH logic (310), the manifest parser (305), and the DASH Access API (315) can control the fetching of media segments from the HTTP Stack (320) based on information regarding media segments provided in the manifest.

The inband event and moof parser (325) can parse a media dataflow into media segments including media content, timed metadata in a timed metadata track, and any signaled inband events in the media segments. The media segments including media content can be parsed by a file format parser (345) and stored in the media buffer (350).

The events stored in the buffer (335) can allow the synchronizer/dispatcher (340) to communicate to the application the available events (or events of interest) related to the application through an event/metadata API. The application can be configured to process the available events (e.g., MPD events, inband events, or timed metadata events) and subscribe to particular events or timed metadata by notifying the synchronizer/dispatcher (340). Any events stored in the buffer (335) that are not related to the application, but are instead related to the DASH client itself can be forwarded by the synchronizer/dispatcher (340) to the DASH logic (310) for further processing.

In response to the application (390) subscribing to particular events, the synchronizer/dispatcher (340) can communicate to the application event instances (or timed metadata samples) corresponding to event schemes to which the application has subscribed. The event instances can be communicated in accordance with a dispatch mode indicated by the subscription request (e.g., for a specific event scheme) or a default dispatch mode. For example, in an on-receive dispatch mode, event instances may be sent to the application (390) upon receipt in the buffer (335). On the other hand, in an on-start dispatch mode, event instances may be sent to the application (390) at their associated presentation time, for example in synchronization with timing signals from the media decoder (355).

DASH/CMAF Media Track Switching

In DASH and CMAF, multiple switchable media tracks are supported. These media tracks may be provided for same media content, but may each have different bit-rates, to support different resolutions and different transmission bandwidth conditions. In a media streaming session, a client (e.g., DASH client or CMAF client) may choose to switch from one track to another, for example, to adapt to a certain bandwidth condition, a bandwidth resource allocated to the client, or the like.

In some example implementations, a media track may also be referred to as a media representation.

Figure 4:
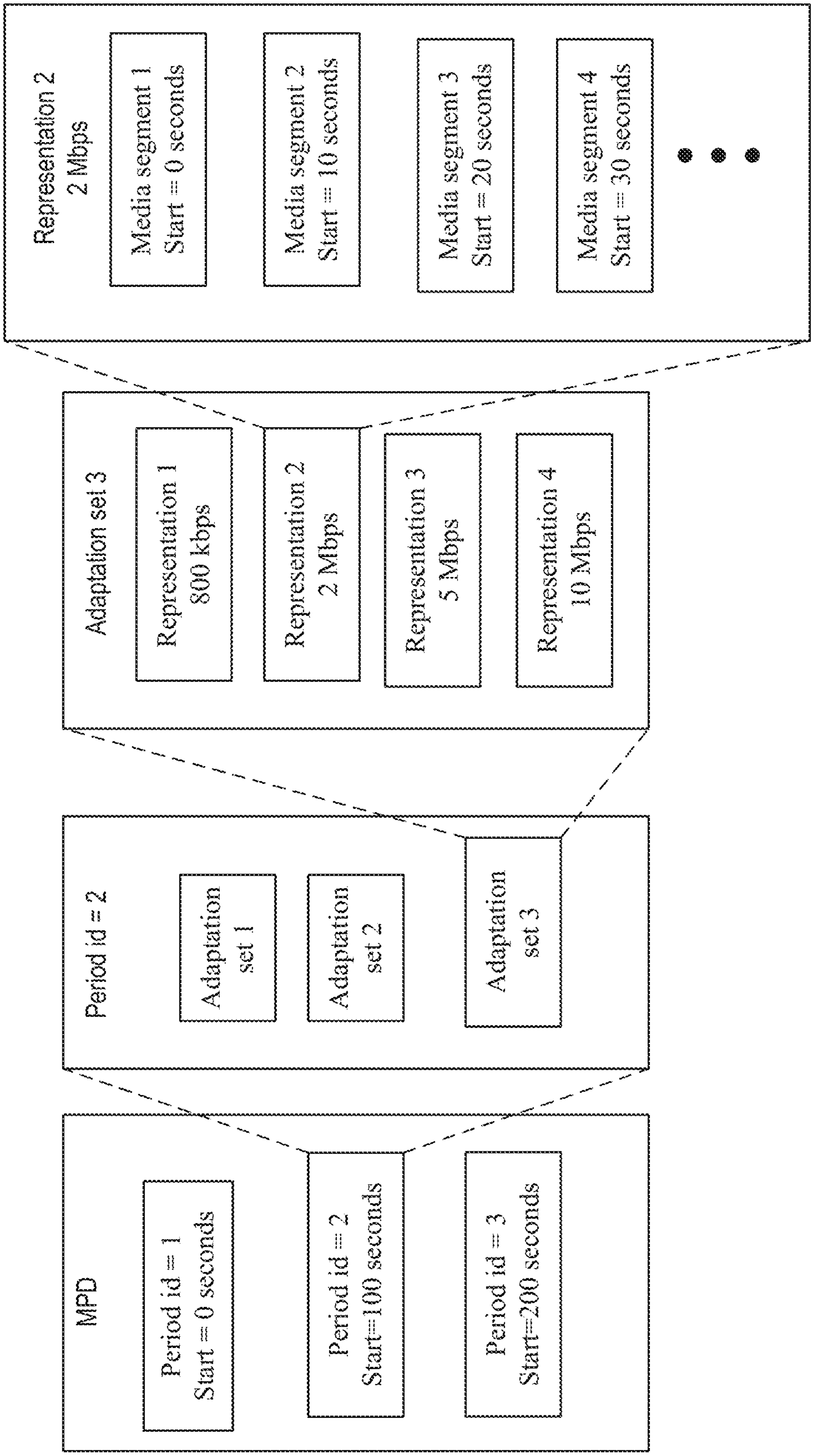
FIG. 4 shows an example DASH data model according to an embodiment of the present disclosure.

FIG. 4 shows an example DASH data model. As shown in FIG. 4, adaptation set 3 includes 4 representations each representing a different track with different bit rate. Representation 2 has a 2 Mbps (megabits per second) bit rate, and is formed by one or more media segments. Exemplarily, in the DASH data model shown in FIG. 4, the smallest media slice unit is a "segment".

Figure 5:
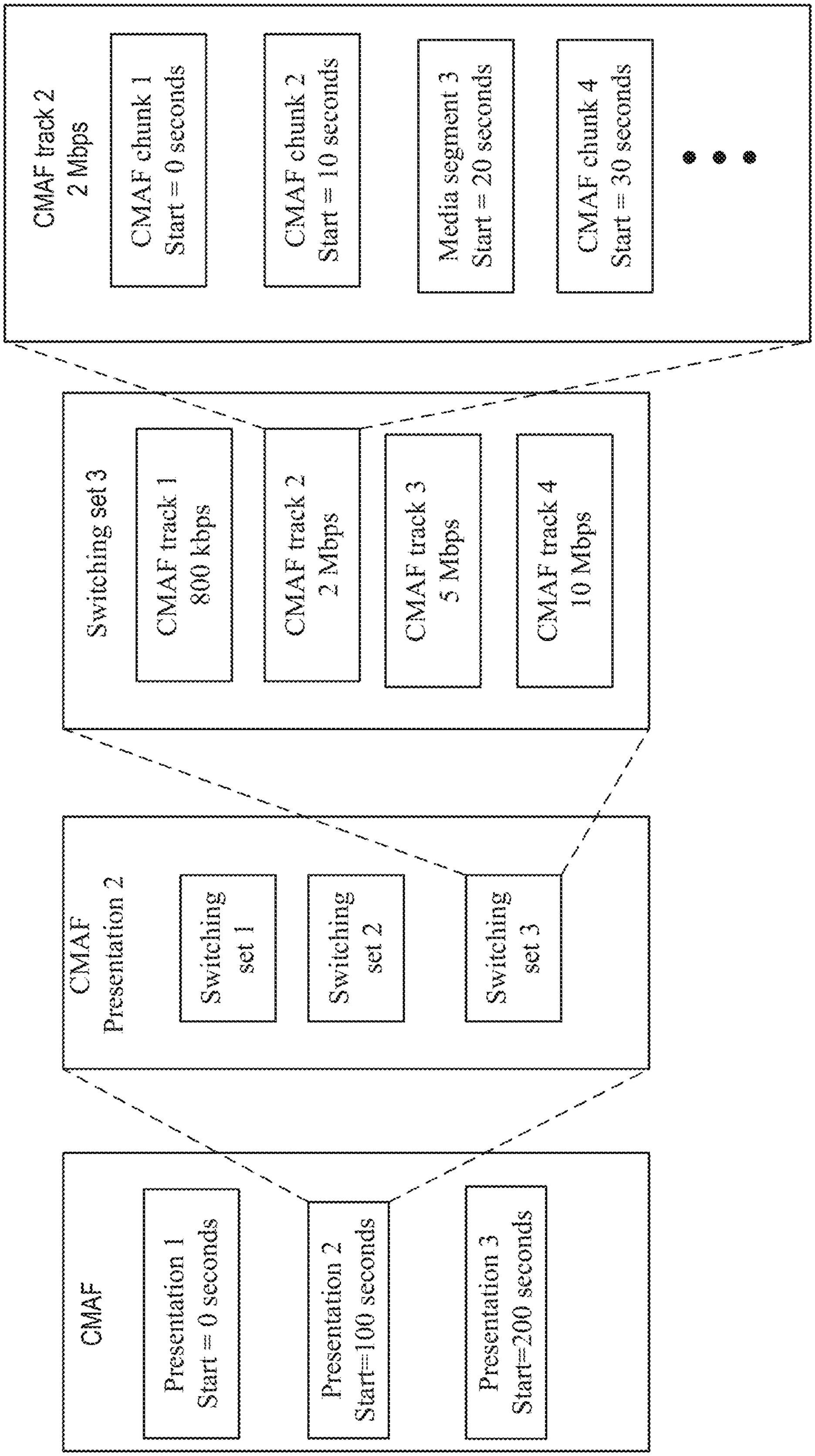
FIG. 5 shows an example CMAF data model according to an embodiment of the present disclosure.

FIG. 5 shows an example CMAF data model. As shown in FIG. 5, switching set 3 includes 4 CMAF tracks each representing a different bit rate. CMAF track 2 has a 2 Mbps bit rate, and is formed by one or more chunks. Exemplarily, in the CMAF data model shown in FIG. 5, the smallest media slice unit is a "chunk".

DASH/CMAF Addressable Resource Index

In some example implementations, it is desirable that an adaptive streaming client (e.g., DASH or CMAF client) has exact knowledge of Addressable Resource Index (ARI) information, which describes all details of the addressable resources and sub-sets of, for example, a CMAF Switching Set as defined in ISO/IEC 23000-19 in a metadata track. The ARI information may also describe all details sub-sets of a DASH adaptation set. The ARI information may include: offset, size, duration and quality of timed aligned segments or chunks that exist in the same adaptation set/switching set. With such ARI information, a DASH/CMAF client may use relative information about, for example, the upcoming chunks or segments to help client heuristics. Addressable Resources may include Track Files, Segments, or Chunks in the CMAF context. For on-demand services, an exact map of such information may be provided by the segment index. Note that similar concept and implementation may also apply to the DASH context.

In some example implementations, the ARI information may be carried in ARI samples in ARI track, or ARI events.

In some example implementations, the Addressable Resource Index (ARI) may be defined as following:

Sample Entry Type: 'cari'

Container: Sample Description Box ('stsd')

Mandatory: No

Quantity: 0 or 1

This metadata describes all details in of the addressable resources and subsets of a CMAF Switching Set, for example, as defined in ISO/IEC 23000-19 in a single Index track.

Table 1 below shows an exemplary sample entry for CMAF Addressable Resource Index Metadata.

TABLE 1

ARI Metadata sample entry

```
class CmafAriMetaDataSampleEntry( )
    extends MetaDataSampleEntry ('cari') {
```

TABLE 1-continued

ARI Metadata sample entry

```
    CmafAriConfigurationBox( );
}
aligned(8) class CmafAriConfigurationBox
    extends FullBox('cari', version = 0, flags = 0)      {
    unsigned int(32) switching_set_identifier;
    unsigned int(16) num_tracks;
    unsigned int(16) num_quality_indicators;
    for(i=1; i <= num_tracks; i++)      {
      unsigned int(32) track_id;
      // provides the order of the tracks for each sample
    }
  // additional information on the CMAF Switching Set may be
  provided
    for(i=1; i <= num_quality_indicators; i++)                {
      string quality_identifier;
    }
}
```

Table 2 below shows an exemplary syntax for ARI samples.

TABLE 2

Syntax for ARI Sample

```
class CmafAriFormatStruct ( ) {
  for(i=1; i <= num_tracks; i++) {
   // this information may also be provided per track
    unsigned int(1)            segment_start_flag;
    unsigned int(1)              marker;
    unsigned int(3)              SAP_type;
    unsigned int(1)            emsg_flag;
    unsigned int(1)            prft_flag;
    bit(25) reserved;
     unsigned int(32) offset
     unsigned int(32) size;
     for(i=1; i <= num_quality_indicators; i++)      {
        unsigned int(32) quality;
    }
     unsigned int(1) loss;
     bit(15) reserved;
     unsigned int(8) num_prediction_pairs;
     for(i=1; i <= num_prediction_pairs; i++)          {
        unsigned int(32)       prediction_min_window;
      unsigned int(32)         predicted_max_bitrate;
}
```

Exemplarily, the semantics for the above syntax is described below:

switching_set_identifier specifies a unique identifier for the switching set in the context of the application.

num_tracks indicates the number of tracks indexed in the ARI track.

track_ID provides the selection and ordering in the samples of the tracks using the track_IDs.

num_quality_indicators specifies the number of quality indicators used for identifying the quality of the chunk.

quality_identifier specifies an identifier that tells how the quality values in the sample are expected to be interpreted. This is a 4CC code that can be registered.

segment_start_flag indicates whether the chunk is the start of a segment.

marker identifies if this chunk includes at least one styp box.

SAP_type identifies the SAP type of the chunk.

emsg_flag indicates whether this chunk provides at least one emsg box.

prft_flag indicates whether this chunk includes at least one prft box.

offset identifies the offset of the chunk from the start of the segment.

size provides the size in octets of the chunk.

quality provides the quality of the chunk according to a given quality scheme identifier. The data type of the quality value (integer or float) is defined by the quality scheme. If the quality scheme identifier is a null string, then quality is an unsigned integer, interpreted linearly with quality increase with increasing value.

loss indicates that the media data of the chunk is lost.

num_prediction_pairs provides how many pairs of the expected prediction values are provided.

prediction_min_windows provides a value for minbuffer time identical to the MPD value.

predicted_max_bitrate provides a value for bandwidth identical to the MPD semantics that holds for the duration of the prediction_min_windows value.

Carriage of ARI with Events

In example implementations under DASH/CMAF, a dedicated metadata track, namely ARI track, is created, to carry ARI related information such as offset, size, and quality of timed aligned segments or chunks that exist in the same adaptation set/switching sets, so the client may have relative information about the upcoming chunks or segments to help client heuristics, for example, client may use the information in dynamic switching between media tracks or representations.

Note that one downside of using a metadata track for carrying the ARI information (e.g., ARI samples) is excessive signaling overhead. For example, for each segment that requires the ARI information, an extra HTTP GET Request is needed by the client.

Embodiments in the present disclosure include a method for carrying ARI (or, ARI information, ARI samples) without using the ARI metadata track. That is, rather than using a metadata track for carrying ARI, which takes extra HTTP GET requests (as the ARI samples are sent separately with the media segments/chunks), in this disclosure, ARI samples may be sent via events, such as inband events, or MPD events. This approach for carrying ARI samples is considered to be "media segment/chunk associated ARI transmission", as the ARI samples are sent together with the media segments/chunks. An event carrying ARI is referred to as an ARI event. Using ARI events may provide at least following advantages:

1. There is no need for an extra metadata track, which results in one less HTTP GET Request by the CMAF/DASH client for each segment/chunk that needs additional ARI information. For example, the CMAF/DASH client may need additional ARI information to help process a segment/chunk. In this case, the ARI information may be directly retrieved from the ARI event carried together with the segment/chunk.

2. The event processing model allows the process of event messages and dispatching them to the DASH/CMAF client. The processing model allows the timing of the ARI samples to be carried as part of the event timing model.

3. Flexibility—in terms of ARI information may be carried by event(s) in one, some, or all representations in a DASH adaptation set or a CMAF switching set, for example, as needed by inband events.

4. Adaptability and portability—ARI events may be parsed by a packager (e.g., from inband events or received ARI track from encoder) and be added to MPD as MPD events.

In some example implementations, the ARI information of a chunk/segment can be included in the same chunk/segment.

In some example implementations, the ARI information of a chunk/segment can be included in following chunks/segments arranged in temporal axis.

In some example implementations, rather than using inband event to carry ARI information, an MPD event may be used to carry ARI information. In particular, this implementation may be suitable for on-demand content.

In some example implementations, ARI information may be carried in emsg boxes. Each emsg box may belong to an event scheme that is defined by or associated with a scheme URN identifier.

Table 3 below illustrates example parameters for ARI event in MPD.

TABLE 3

Parameters for ARI event in MPD

| Attribute | Value |
|---|---|
| EventStream@schemeIdUri/<br>InbandEventStream@schemeIdUri | "urn:mpeg:dash:event:ari:2022" or<br>"urn:mpeg:dash:event:ari-next:2022" |
| EventStream@value/<br>InbandEventStream@value | Carries following CmafAriMetaDataSampleEntry fields:<br>- switching_set_identifier<br>- num_tracks<br>- num_quality_indicators<br>- ordered list of track_ids<br>- list of quality_identifier |
| Event@presentationTime | The chunk offset from the start of Period in which the ARI information in the event is applied. |
| Event@duration | The duration for which the ARI information should be used (e.g., the duration of chunk, or duration of segment). |
| Event body | Same as CmafAriFormatStrct fields defined in Table 2, base-64 encoded:<br>for (i=1; i <= num_tracks; i++) {<br>unsigned int(1) segment_start_flag;<br>unsigned int(1) marker;<br>unsigned int(3) SAP_type;<br>unsigned int(1) emsg_flag;<br>unsigned int(1) prft_flag;<br>bit(25) reserved; |

TABLE 3-continued

Parameters for ARI event in MPD

| Attribute | Value |
| --- | --- |
| | unsigned int(32) offset<br>unsigned int(32) size;<br>for(i=1;i<=num__quality__indicators;i++) {<br>unsigned int(32) quality;<br>}<br>unsigned int(1) loss;<br>bit(15) reserved;<br>unsigned int(8) num__prediction__pairs;<br>for(i=1;I <= num__prediction__pairs;i++){<br>unsigned int(32)prediction__min__window;<br>unsigned int(32)predicted__max__bitrate;<br>}<br>} |

As shown in Table 3, two elements, EventStream and InbandEventStream, may be used to describe ARI events. Both streams may include a value attribute. The value attribute may carry the CmafAriMetaDataSampleEntry field, as described in Table 1. For example, the CmafAriMetaDataSampleEntry field may include following fields:

switching_set_identifier num_tracks num_quality_indicators ordered list of track_ids list of quality_identifier In some example implementations, the Event element may include a presentaionTime attribute (e.g., Event@presentationTime), indicating a chunk offset from the start of Period in which the ARI information in the event is applied.

In some example implementations, the Event element may include a duration attribute (e.g., Event@duration), indicating the duration for which the ARI information should be used. For example, this may include the duration of a chunk, or duration of a segment.

In some example implementations, the event may include an event body. The event body may share the same construct as the CmafAriFormatStruct, which is defined in Table 2.

Table 4 below illustrates example emsg parameters for inband ARI events.

TABLE 4

Parameters for inband ARI event

| Attribute | Value |
| --- | --- |
| scheme__id__uri | "urn:mpeg:dash:event:ari:2022" or "urn:mpeg:dash:event:ari-next:2022" |
| value | Carries following CmafAriMetaDataSampleEntry fields:<br>- switching__set__identifier<br>- num__tracks<br>- num__quality__indicators<br>- ordered list of track__ids<br>- list of quality__identifier |
| presentation__time__delta/ prsentation__time | As an example, presentation__time__delta = 0. |
| event__duration | This value may be set to, for example, the chunk or segment duration. |
| message__data | Same as CmafAriFormatStruct fields defined in Table 2, base-64 encoded:<br>for(i=1; i <= num__tracks; i++) {<br>unsigned int(1) segment__start__flag;<br>unsigned int(1) marker;<br>unsigned int(3) SAP__type;<br>unsigned int(1) emsg__flag;<br>unsigned int(1) prft__flag;<br>bit(25) reserved;<br>unsigned int(32) offset<br>unsigned int(32) size;<br>for(i=1;i<=num__quality__indicators;i++) {<br>unsigned int(32) quality;<br>}<br>unsigned int(1) loss;<br>bit(15) reserved;<br>unsigned int(8) num__prediction__pairs;<br>for(i=1;I <= num__prediction__pairs;i++){<br>unsigned int(32)prediction__min__window;<br>unsigned int(32)predicted__max__bitrate;<br>}<br>} |

Note that the event body in the MPD event and the message data in the inband event share a same CMAF ARI sample structure, CmafAriFormatStruct. Therefore, the parsing and processing of the ARI sample after receiving the event from the event dispatcher would be the same. That is, the same parsing and processing logic may be shared for MPD event and inband event.

In some embodiments, the ARI event may be processed and dispatched according to, for example, clause A.13 of ISO/IEC 23009-1. For example, the ARI event may be processed and dispatched under the exemplary DASH/CMAF client architecture as illustrated in FIG. 3.

In some embodiments, after the ARI event is dispatched, a post-processing of this ARI event will occur. The post-processing may rely on the parameters shown in Table 5.

In track/representation switching, there are two critical time points with regard to switch decision. The first time point is when the client makes a decision for the switch, and the second time point is when (e.g., from which chunk) the switch happens. For example, the switch decision may be made at start of, at end of, or during a chunk, such as the C1 chunk in FIG. 6. The decision may be, for example, switching to track 2 starting from C2 chunk (so C2 chunk is the switch point); or switching to track 3 starting from C1 chunk (C1 chunk is the switch point); or switching to track 2 starting from C3 chunk (C3 chunk is the switch point).

In some embodiments, a switch decision made at chunk i is a decision to switch at chunk i+n, where i and n are non-negative integers.

TABLE 5

Event/timed metadata ARI parameters and datatypes

| API Parameter | MPD event | Inband event | values |
|---|---|---|---|
| scheme_id | EventStream @schemeIdUri | scheme_id_uri | "urn:mpeg:dash:event:ari:2022" or "urn:mpeg:dash:event:ari-next:2022" |
| value | EventStream @value | value | Carries following CmafAriMetaDataSampleEntry fields: - switching_set_identifier - num_tracks - num_quality_indicators - ordered list of track_ids - list of quality_identifier |
| presentation time | Event@presentationTime | presentation_time | The chunk/segment offset from the start of Period in which the ARI information in the event is applied. |
| duration | Event@duration | duration | The duration for which the ARI information should be used (e.g., the duration of chunk, or duration of segment). |
| message | Event body | message_data | Same as CmafAriFormatStruct fields defined in Table 2. Base-64 encoded. Refer to Table 2 for details. |

In this disclosure, various embodiments are described to enhance media track switching by employing ARI events or ARI track samples. For example, the ARI event (or ARI track sample) may carry the size, quality, and offset information of any or all aligned chunks (parallel chunks) of any or all tracks in a same switching set/adaptation set. A CMAF/DASH client may use the information carried in the ARI track sample or ARI event to switch at the relevant chunk boundary to another track/representation.

Figure 6:
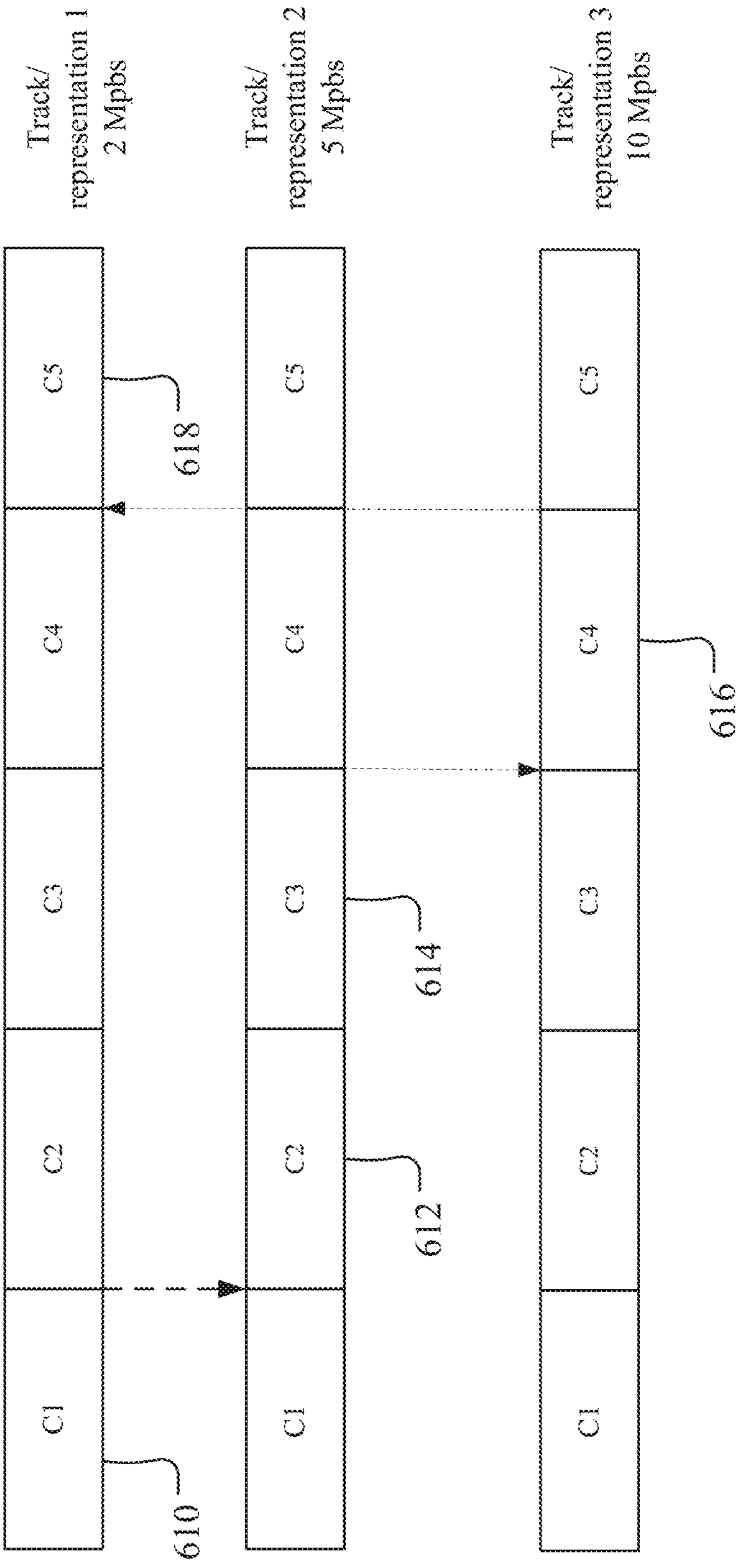
FIG. 6 shows an example for switching media tracks at a segment/chunk level according to an embodiment of the present disclosure.

FIG. 6 shows an example for switching media tracks at a segment/chunk level. As shown in FIG. 6, there are 3 tracks/representations representing, for example, different bit rates. The chunks in each track are time aligned with respective chunks in other tracks. For example, chunks C1 in each track are time aligned. These time aligned chunks in different tracks may be referred to as parallel chunks. For example, all C1 chunks are parallel chunks; all C2 chunks are parallel chunks. In FIG. 6, an exemplary chunk level switching is performed in a following manner:

After C1 610, switch to C2 612; after C3 614, switch to C4 616; after C4 616, switch to C5 618.

Note that in FIG. 6, the track switching is done at a minimum media data unit level that is supported in DASH or CMAF. For example, the unit may be a chunk in CMAF, or a segment in DASH. Switching at a different level, such as a DASH representation level, or a CMAF track level, may also be supported.

In some embodiments, assistance information for switching may be carried in ARI events or ARI track samples. A DASH/CMAF client may use the latest available assistance information to make a decision on switching to a different track/representation.

In some embodiments, for each track/representation, the assistance information may include:

The offset and size of the current (or next) chunk.

The quality of the current (or next) chunk. The quality may include resolution of the media.

In some embodiments, the assistance information may be implicit and the DASH/CMAF client may use the assistance information to derive a switching point.

In some embodiments, the assistance information may be explicit. For example, the assistance information may carry an explicit indication of the switching point (e.g., the chunk and its corresponding track) and the DASH/CMAF client may just follow the assistance information to make the switch.

In this disclosure, when a DASH/CMAF client is in a streaming session, several different approaches may be used with respect to track/representation switching. For example, the client may decide a switch is needed in a next chunk/segment (e.g., current chunk is C1, switch at C2), or in next n-th chunk/segment (e.g., current chunk is C1, switch at C4). For another example, the client may decide an immediate switch is needed for a current chunk. An early switch decision may be beneficial in the sense that the client may start to request/receive/buffer media data earlier. A decision for immediate switch may be desirable, however, if a quick adaptation to a current bandwidth condition is needed. The client may use an appropriate approach as needed.

In some embodiments, if the client is streaming a representation, using chunk transfer, it is getting the chunks/segments in streaming as well as the ARI track or ARI event. For example, the DASH/CMAF client may receive the ARI sample via a track that is different from the media tracks; or the DASH/CMAF client may receive the ARI event which is multiplex with, or embedded in a media chunk.

Figure 7:
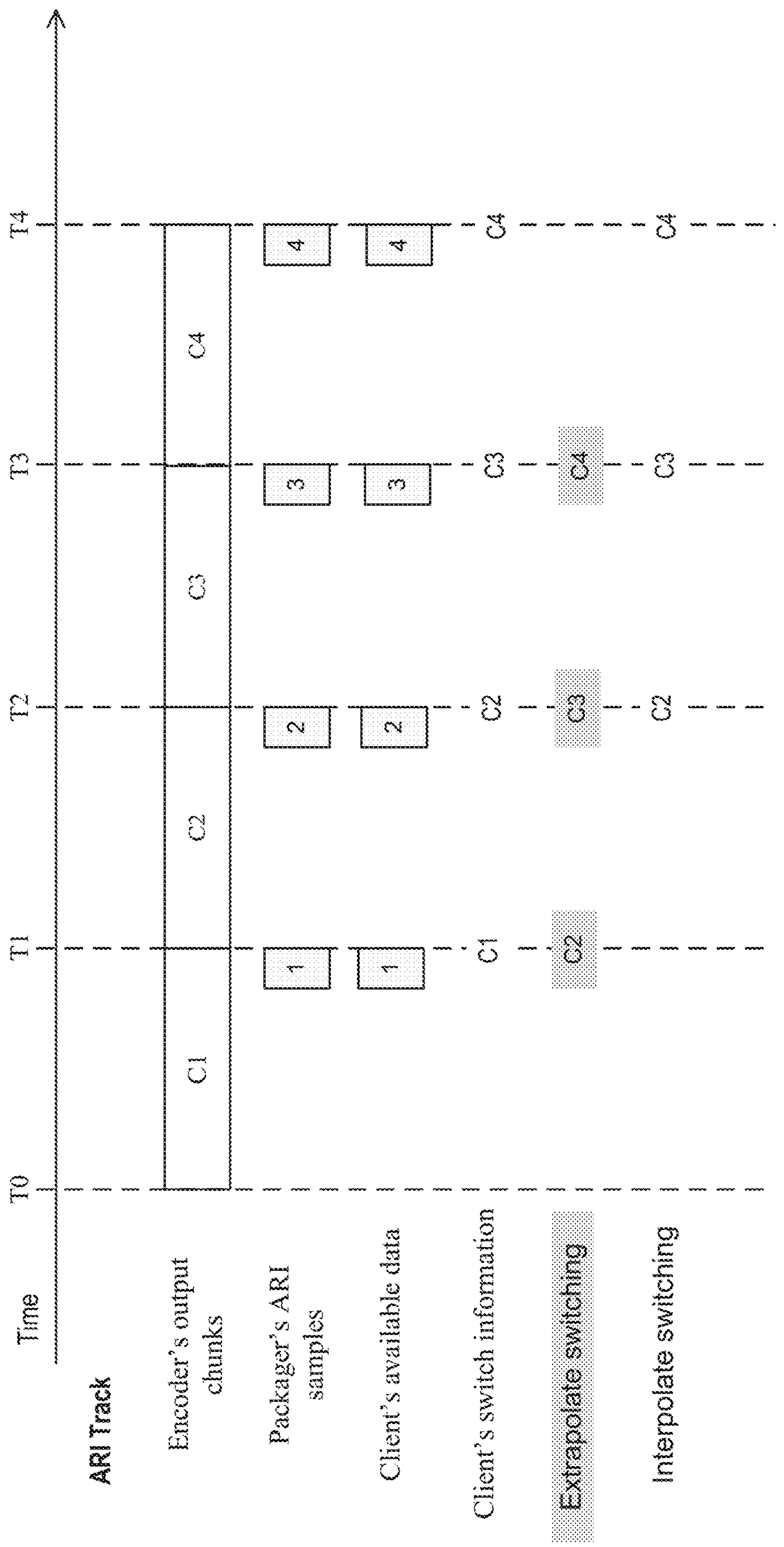
FIG. 7 shows exemplary extrapolate switching and interpolate switching based on ARI track/ARI sample carrying switch assistance information.
Figure 8:
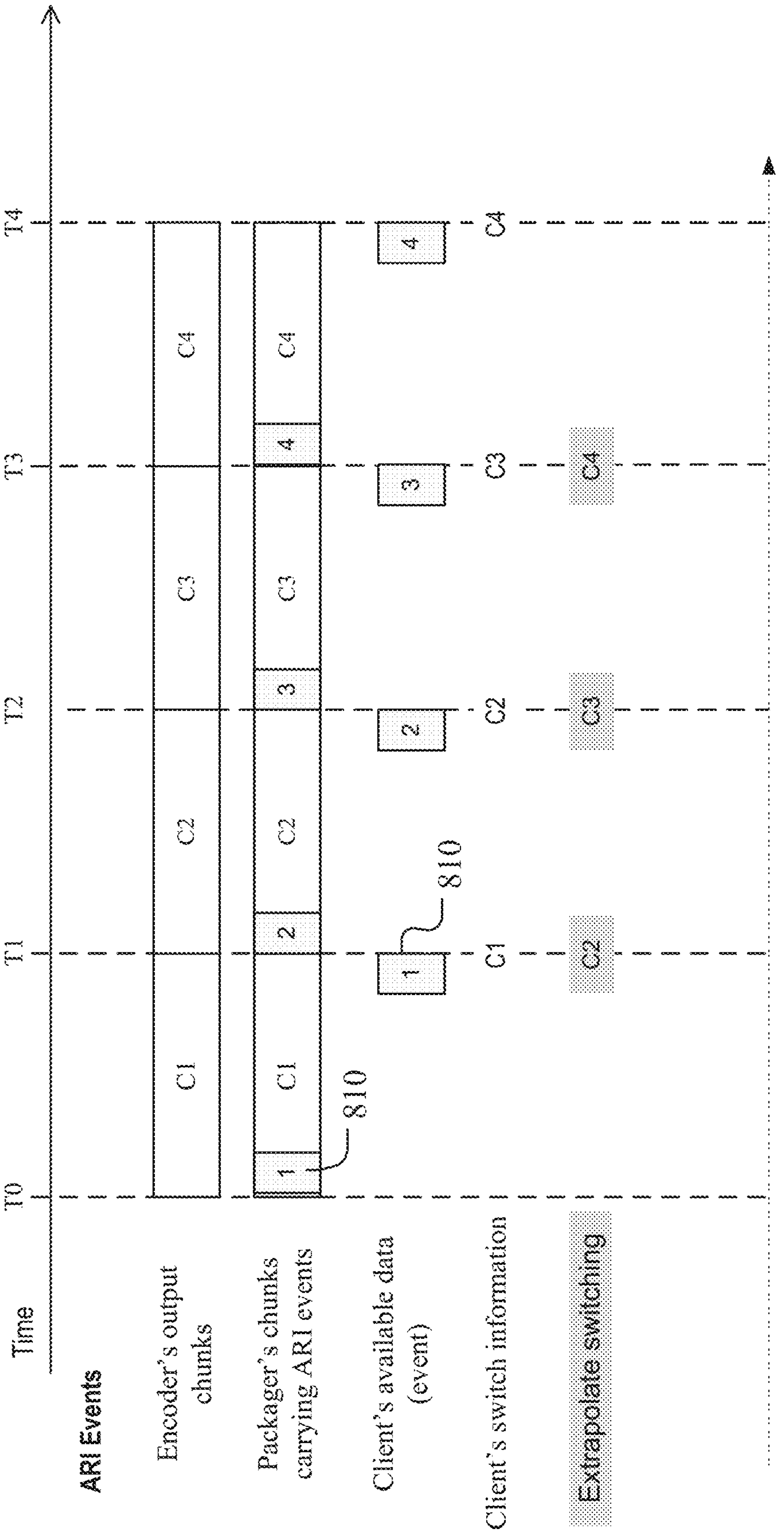
FIG. 8 shows exemplary extrapolate switching based on ARI event carrying switch assistance information
Figure 9:
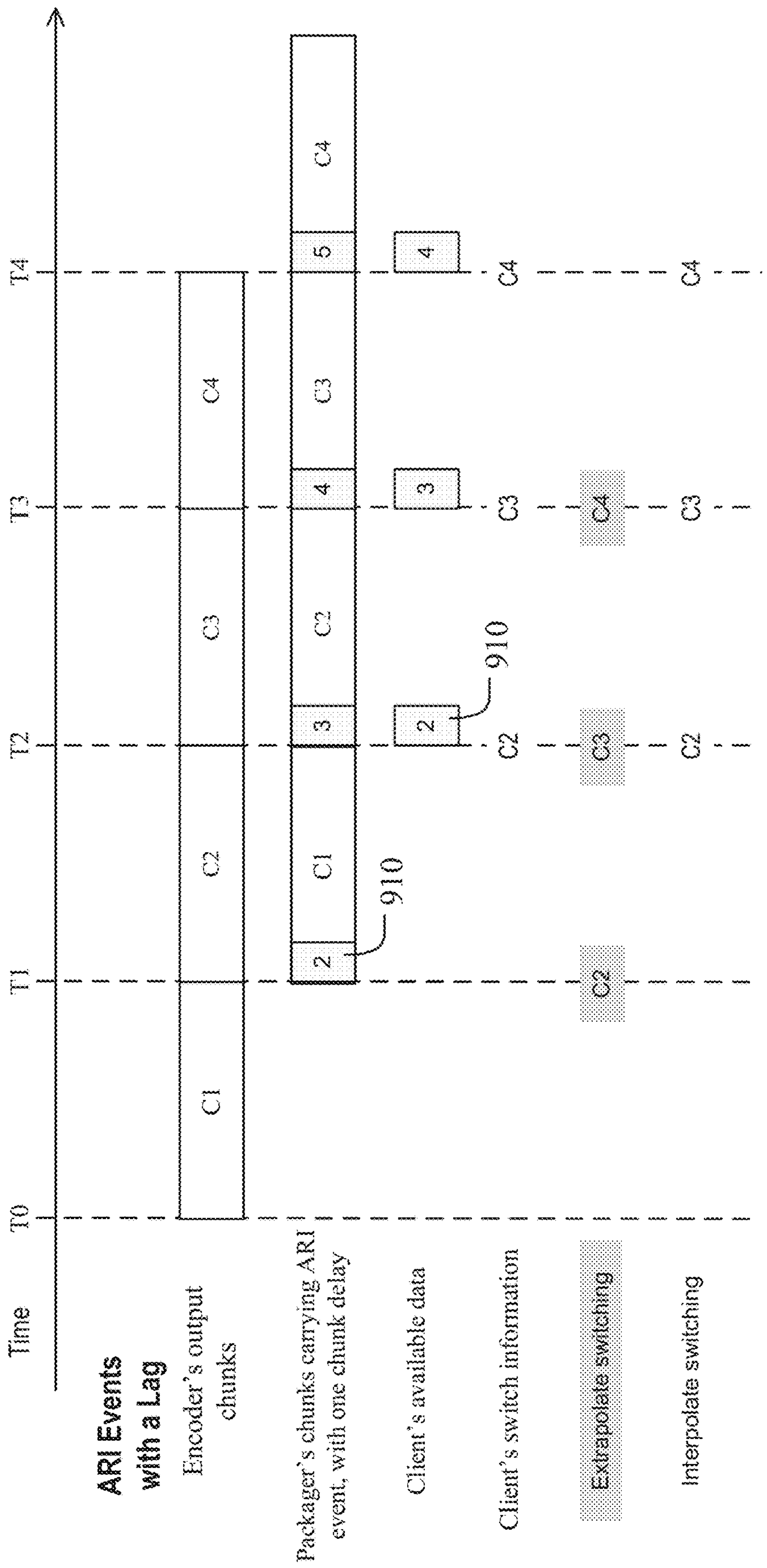
FIG. 9 shows exemplary extrapolate switching and interpolate switching based on ARI event carrying switch assistance information with a lag.

FIGS. 7-9 show example timings of a DASH/CMAF client receiving the ARI information. The ARI information may carry switch assistance information only, or it may carry other information along with the switch assistance information. To simply discussion and illustration, zero transfer delay between encoder and client is assumed in these figures. Under this assumption, the output of the packager, i.e., the chunk/segment, the ARI sample for that chunk/segment, or the chunk/segment with the event embedded in it, are available at the same time to the client once they are ready at the packager. Note that same underlying principle will still apply when transfer delay is considered. In embodiments below, the media unit "chunk" is used for illustration purpose. These embodiments also apply to other media units, such as segment.

In FIGS. 7-9, the dotted vertical line for each time point such as T1, T2, shows the availability of information.

In some embodiments, as shown in FIG. 7, the ARI information for supporting bandwidth switching is carried in ARI track, via, for example, ARI samples. Note that ARI track is a track different from media tracks that include media chunks or media segments.

As shown in FIG. 7, the ARI information (e.g., location, size, and quality) for chunk C1 carried by ARI sample 1 is available (received by DASH/CMAF client) at T1. Then the client can use the ARI information of C1 (or associated with C1) and make a decision to switch at C2. That is, at T1, based on the C1 ARI information, the client is able to decide to switch before receiving C2 chunk (i.e., next chunk of C1). Since the ARI information is about or associated with the received chunk C1, and the switch decision is for a next chunk, this method is referred to as extrapolate switching. That is, a switch decision is made based on ARI information of the past chunk for switching at next chunk and therefore, the switch decision is based on an estimation/prediction. ARI information is used for determining a switch at a future chunk, the characteristics of that future chunk is an estimate or prediction. For example, ARI information for C1 is used to estimate/predict characteristics of chunk C2. Once the switch decision is made based on the ARI information, the client will switch to another track for C2 chunk.

In some example implementations, the client may start to receive and/or buffer the C2 chunk of the desired chunk once the switch decision is made.

In some example implementations, the ARI sample 1 in FIG. 7 may carry switch assistance information (location, size, and quality) of a portion or all parallel chunks (e.g., C1 chunks in all tracks as shown in FIG. 6). For example, ARI information may carry switch assistance information for all parallel C1 chunks.

In addition to the extrapolate switching solution as described above, embodiments of this disclosure further provide an interpolate switching solution when ARI track is used. As shown in FIG. 7, ARI information carried by ARI sample 2 for C2 chunk will become available to the client at T2. That is, the client will need to wait till T2 to get ARI information of C2. Then based on the C2 ARI information, the client may make a decision to switch on C2 (i.e., the switch point is C2 chunk, or switch to a parallel C2 chunk of another track). In this case, in order for the client to make a decision on whether to switch at C2 chunk, the ARI information for C2 chunk itself is used and the ARI information is accurate. In this case, the switch decision is based on accurate information, rather than in the extrapolating solution, in which the switch decision is based on estimation from previous chunk(s).

Exemplarily, the ARI information carried by ARI sample 2 may be for one or more parallel C2 chunks, or for all the parallel C2 chunks.

As a comparison, both the extrapolate switching method and the interpolate switching method as discussed above choose to switch at C2 chunk. In extrapolate switching, the switch decision is made at T1, based on an estimation/prediction from ARI information for C1 chunk. The estimation/prediction may be performed with further reference to at least one of:

- A current network condition, such as bandwidth available to the DASH/CMAF client;
- A current playback requirement, such as media quality, media size, and media offset.

the DASH/CMAF client, by using an estimation/prediction from ARI information for C1 chunk, is able to make a decision on whether a switch is needed and which C2 chunk will be selected for the switch (if a switch is needed).

On the other hand, in interpolate switching, the switch decision is made at T2, based on the ARI information for C2 chunk which is accurate for the switch decision. Note that the switch decision may be made based the ARI information with reference to the current network condition, and/or the current playback requirement.

Therefore, extrapolate switching may gain an earlier switch decision (i.e., decision at T1, earlier than T2), but the decision is estimation/prediction based. Interpolate switching may gain a more accurate switch decision, but the decision is made later, for example, by one chunk (i.e., decision at T2, later than T1 by one chunk). Once the switch decision is made, the client may start to request/receive/buffer the chunk of choice.

In some example implementations, under interpolate switching method, the client may first receive the ARI sample (e.g., for chunk C2) and then with one chunk delay, receive the corresponding chunk.

In some embodiments, the bandwidth switching/track switching is performed based on ARI event (with no lag). As shown in FIG. 8, the ARI information for supporting bandwidth switching (i.e., switch assistance information) is carried in ARI event(s), which is multiplexed with, or embedded in chunk(s).

As shown in FIG. 8, the switch assistance information (e.g., location, size, and quality) for chunk C1 carried by ARI event 1 (labeled 810) is available to the client (received by client) at T1. Note that since the event is "inband" with chunk C1, both event 1 and chunk C1 are received by the DASH/CMAF client at T1. In this case, the extrapolate switching method as discussed above may be used. That is, based on the ARI information for chunk C1, the client is able to make a switch decision using prediction/estimation, with further reference to the current network condition, and/or the current playback requirement. If a switch is desired at C2, the client may further select the particular C2 chunk among parallel C2 chunks.

Note that in this scenario, the interpolate switching method is not suitable. As in interpolate switching, the ARI event in the current chunk is supposed to be used for indicating (directly or indirectly) a switching at the current chunk, but since the chunk is already received, it is too late to make the switch. For example, when ARI event 1 is received, chunk C1 is also received, therefore the earliest time to make the switch will be T2.

In some embodiments, the bandwidth switching/track switching is performed based on ARI event with a lag. As shown in FIG. 9, the ARI information for supporting bandwidth switching (i.e., switch assistance information) is carried in ARI event(s), with one chunk delay. In this case, chunk i has an ARI event about chunk i+1, where i is an integer. An example is given below with reference to FIG. 9.

In FIG. 9, ARI event 2 (labeled 910) carries switch assistance information for C2 chunk and can only be compiled after C2 chunk is ready from the encoder side. Therefore, on the packager side, there is a one chunk delay: rather than packaging the chunk C1 in parallel (or in synchronization) with the encoder's output, the packager will have to wait for a duration of one chunk, to let C2 chunk be generated by the encoder and ARI event 2 be compiled based on the C2 chunk, then multiplex ARI event 2 with C1 chunk. Note that in this case, a current chunk such as C1, carries ARI event for a following chunk (e.g., chunk i carries ARI event for chunk i+n, where i and n are integers).

FIG. 9 illustrates the above discussed delay pattern. As shown in FIG. 9, for a same chunk, the timeline for the packager is shifted to the right by one chunk.

In FIG. 9, switch assistance information of C2 chunk is available at T2 along with the C1 chunk.

In some example implementation, extrapolate switching method may be used to make switch decision. For example, at T2, based on the switch assistance information for C2 chunk which is carried in C1 chunk, the client is able to make a switch decision on whether to switch at C3 chunk, using prediction/estimation, with further reference to the current network condition, and/or the current playback requirement. If a switch is desired, the client may further select the particular C3 chunk among parallel C3 chunks. Using extrapolate switching method, a switch decision is based on a past chunk for switching at a next chunk (or a future chunk), for example, a switch decision is made based on C1 chunk for switching at C3 chunk.

In some example implementation, interpolate switching method may be used to make switch decision. For example, at T2, based on the switch assistance information for C2 chunk which is carried in C1 chunk, the client is able to make a switch decision on whether to switch at C2 chunk, with further reference to the current network condition, and/or the current playback requirement. If a switch is desired, the client may further select the particular C2 chunk among parallel C2 chunks. Using interpolate switching method, a switch decision is based on accurate switch assistance information for the chunk to be switched to. For example, as the switch assistance information carried in C1 chunk is for C2 chunk, the switch assistance information is accurate for making a switch decision on switching at C2 chunk. Note that when the switch decision is made at T2, and C2 chunk has not been fetched yet.

Figure 10:
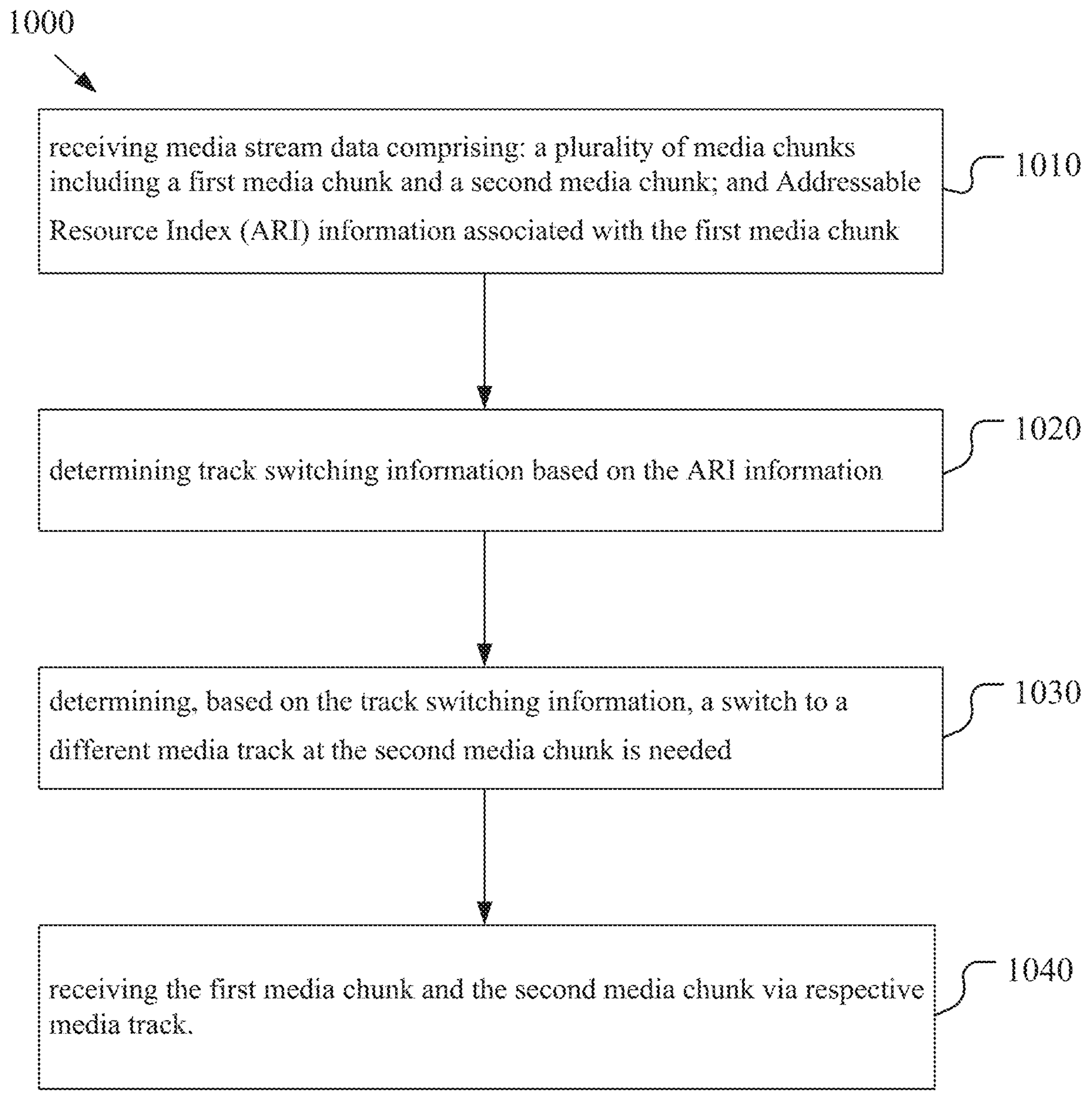
FIG. 10 shows flow charts of a method according to an example embodiment of the disclosure.

FIG. 10 shows an exemplary method 1000 for processing a media stream. The media stream may include, for example, a 4G media stream (for media stream delivered in a 4G network), or a 5G media stream (for media stream delivered in a 5G network). The method may be implemented by, for example, a computer system, which is described in later section; a client device, which may be part of, or integrated to an encoder and/or decoder. The media stream may follow a DASH or CMAF standard. The method 1000 may include a portion or all of the following step: step 1010, receiving media stream data comprising: a plurality of media chunks including a first media chunk and a second media chunk; and Addressable Resource Index (ARI) information associated with the first media chunk; step 1020, determining track switching information based on the ARI information; step 1030, determining, based on the track switching information, a switch to a different media track at the second media chunk is needed; and step 1040, receiving the first media chunk and the second media chunk via respective media track.

In some example implementations, in step 1040, when receiving the first media chunk and the second media chunk via respective media track, each of the first media chunk and the second media chunk is delivered to the streaming client device with a delivery delay that is no more than one chunk.

In some example implementations, the ARI information may include, or may be carried via one of: ARI sample(s), or ARI event(s). Method 1000 may further include: the ARI information comprises at least one of: an ARI sample from an ARI track associated with a first media slice that is in a first media track of the media stream; or an ARI event associated with the media stream embedded in the first media slice that is in the first media track of the media stream.

In some example implementations, method 1000 may further include: receiving one of: an Addressable Resource Index (ARI) sample from an ARI track associated with a first media slice that is in a first media track of the media stream; or an ARI event associated with the media stream embedded in the first media slice that is in the first media track of the media stream; wherein the ARI event provides characteristic information for at least one of: the first media slice in the first media track; and first parallel media slices that are in other media tracks of the media stream and are aligned with the first media slice; or a second media slice that is in the first media track and follows the first media slice; and second parallel media slices that are in the other media tracks of the media stream and are time aligned with the second media slice.

Embodiments in this disclosure apply to both DASH and CMAF, as well as other media streaming technologies by applying similar underlying principle.

Embodiments in the disclosure may be used separately or combined in any order. Methods in this disclosure, such as method 1000 described above, may include all or just a portion of the steps listed. Further, each of the methods (or embodiments), the DASH client, the CMAF client may be implemented by processing circuitry (e.g., one or more processors or one or more integrated circuits). In one example, the one or more processors execute a program that is stored in a non-transitory computer-readable medium. Embodiments in the disclosure may be applied to DASH and/or CMAF technologies/standard. Exemplarily, each of the methods (or embodiments) may be performed by a DASH/CMAF client, the client may be running in a computer device comprising the processing circuitry. For example, the client may be running in an encoder and/or a decoder.

The techniques described above, can be implemented as computer software using computer-readable instructions and physically stored in one or more computer-readable media.

Figure 11:
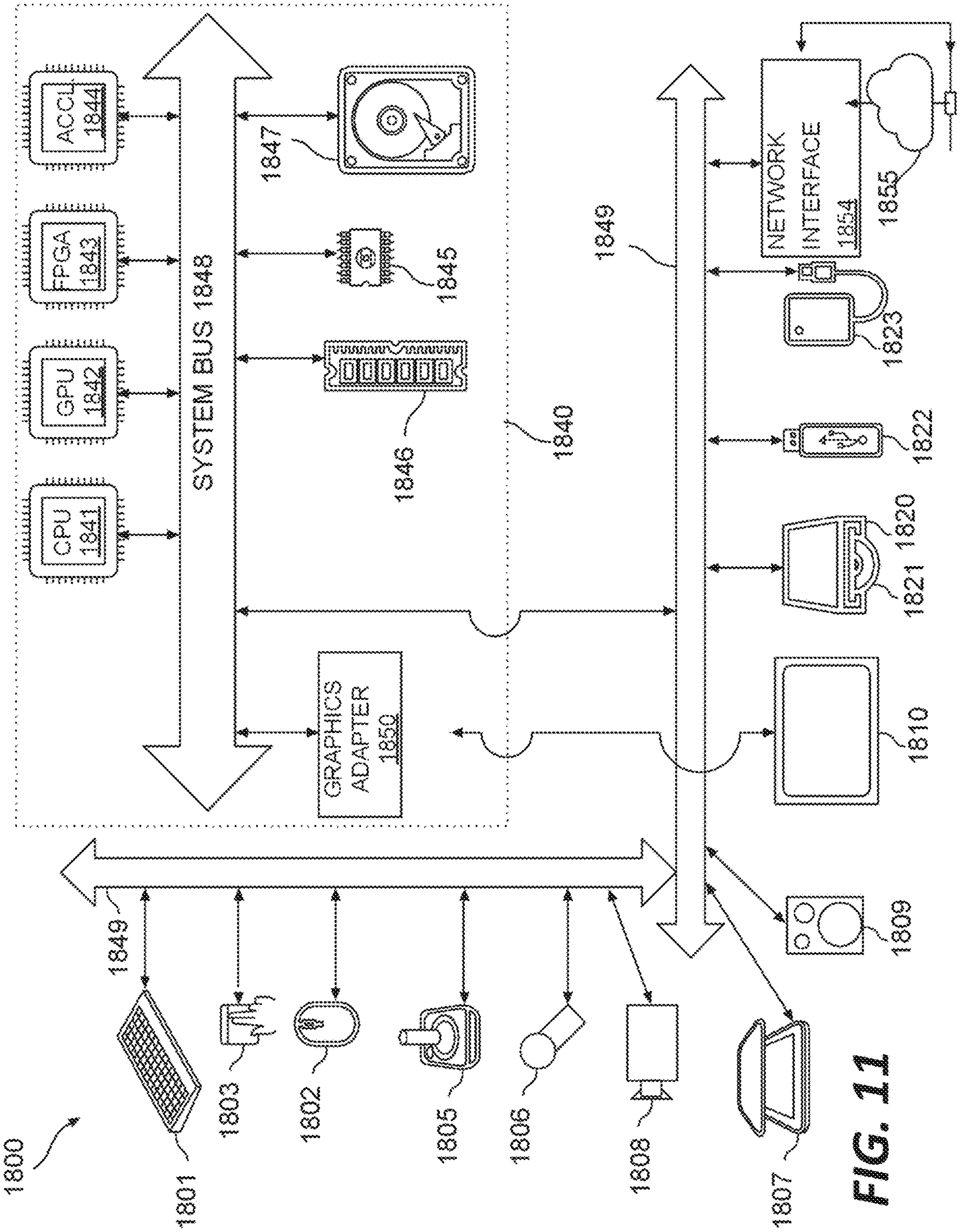
FIG. 11 shows a schematic illustration of a computer system in accordance with example embodiments of the disclosure.

For example, FIG. 11 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 11 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition to or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for processing a media stream, the media stream comprising at least two media tracks, wherein the at least two media tracks are Dynamic Adaptive Streaming over HTTP (DASH) standard media tracks or Common Media Application Format (CMAF) media tracks, perform by a streaming client device, the method comprising:

receiving media stream data comprising: a plurality of media chunks including a first media chunk and a second media chunk; and Addressable Resource Index (ARI) information associated with the first media chunk, wherein the ARI information carries offset, size, duration and quality of timed aligned segments or chunks and comprises an ARI event associated with the media stream, wherein the ARI event is an inband event and is embedded in a first media slice that is in a first media track of the media stream such that the ARI event presents in the first media slice without using a metadata track, wherein the ARI event carries track switching information, and wherein the first media track comprises a media representation;

determining track switching information based on the ARI information;

determining, based on the track switching information and a bandwidth available to the streaming client device, a switch to a different media track at the second media chunk is needed; and receiving the first media chunk and the second media chunk via respective media track, wherein each of the first media chunk and the second media chunk is delivered to the streaming client device with a delivery delay that is no more than one chunk.

2. The method of claim 1, wherein:

the media stream follows a DASH standard, and the first media slice is a segment in the media stream; or the media stream follows a CMAF format, and the first media slice is a chunk in the media stream.

3. The method of claim 2, wherein the ARI information provides characteristic information for at least one of:

the first media slice in the first media track; and first parallel media slices that are in other media tracks of the media stream and are aligned with the first media slice; or a second media slice that is in the first media track and follows the first media slice; and second parallel media slices that are in the other media tracks of the media stream and are time aligned with the second media slice.

4. The method of claim 3, wherein the characteristic information comprises at least one of:

an offset of the first media slice of the first media track;

a size of the first media slice of the first media track;

an offset of each of the first parallel media slices;

a size of the each of the first parallel media slices;

a quality of the first media slice of the first media track; or a quality of the each of the first parallel media slices.

5. The method of claim 3, wherein determining, based on the track switching information, the switch to the different media track at the second media chunk is needed comprises:

determining, based on the characteristic information and a bandwidth available to the streaming client device, the switch to the one of the other media tracks being needed.

6. The method of claim 3, wherein:

the ARI event is received and the ARI event provides characteristic information for: the first media slice in the first media track, and the first parallel media slices that are in other media tracks of the media stream and are time aligned with the first media slice; and determining whether the switch to the one of the other media tracks being needed comprises:

selecting one of the second parallel media slices based on an estimation using the characteristic information; and switching to the one of the second parallel media slices after the first media slice.

7. The method of claim 6, wherein the media stream is encoded and transmitted in real time, and the ARI event is constructed without a consideration of the second media slice and the second parallel media slices.

8. The method of claim 3, wherein:

the ARI event is received and the ARI event provides characteristic information for: the second media slice that is in the first media track and follows the first media slice; and second parallel media slices that are in the other media tracks of the media stream and are time aligned with the second media slice; and determining whether the switch to the one of the other media tracks being needed comprises:

selecting one of the second parallel media slices based on the characteristic information; and switching to the one of the second parallel media slices after the first media slice.

9. The method of claim 3, wherein:

the ARI event is received and the ARI event provides characteristic information for: the second media slice that is in the first media track and follows the first media slice; and second parallel media slices that are in the other media tracks of the media stream and are time aligned with the second media slice; and determining whether the switch to the one of the other media tracks being needed comprises:

selecting a target media slice that is next to one of the second parallel media slices based on an estimation using the characteristic information; and switching to the target media slice after the second media slice.

10. The method of claim 9, wherein the media stream is encoded and transmitted in real time, and the ARI event is constructed with a consideration of the second media slice and the second parallel media slices.

11. The method of claim 3, wherein:

an ARI sample is received and the ARI sample provides characteristic information for: the first media slice in the first media track, and the first parallel media slices that are in other media tracks of the media stream and are time aligned with the first media slice; and determining whether the switch to the one of the other media tracks being needed comprises:

selecting one of the second parallel media slices based on an estimation using the characteristic information; and switching to the one of the second parallel media slices after the first media slice.

12. The method of claim 3, wherein:

the ARI sample is received and the ARI sample provides characteristic information for: the first media slice in the first media track, and the first parallel media slices that are in other media tracks of the media stream and are time aligned with the first media slice; and determining whether the switch to the one of the other media tracks being needed comprises:

selecting one of the first parallel media slices based on the characteristic information; and switching to the one of the first parallel media slices.

13. A device comprising a memory for storing computer instructions and a processor in communication with the memory, wherein, when the processor executes the computer instructions, the processor is configured to cause the device to:

receive media stream data of a media stream, wherein the media stream comprises at least two media tracks, wherein the at least two media tracks are Dynamic Adaptive Streaming over HTTP (DASH) standard media tracks or Common Media Application Format (CMAF) media tracks, and wherein the media stream data comprises: a plurality of media chunks including a first media chunk and a second media chunk; and Addressable Resource Index (ARI) information associated with the first media chunk, wherein the ARI information carries offset, size, duration and quality of timed aligned segments or chunks and comprises an ARI event associated with the media stream, and wherein the ARI event is an inband event and is embedded in a first media slice that is in a first media track of the media stream such that the ARI event presents in the first media slice without using a metadata track, wherein the ARI event carries track switching information, and wherein the first media track comprises a media representation;

determine track switching information based on the ARI information;

determine, based on the track switching information and a bandwidth available to the device, a switch to a different media track at the second media chunk is needed; and receive the first media chunk and the second media chunk via respective media track, wherein each of the first media chunk and the second media chunk is delivered to the device with a delivery delay that is no more than one chunk.

14. The device of claim 13, wherein:

the media stream follows a DASH standard, and the first media slice is a segment in the media stream; or the media stream follows a CMAF format, and the first media slice is a chunk in the media stream.

15. The device of claim 14, wherein the ARI information provides characteristic information for at least one of:

the first media slice in the first media track; and first parallel media slices that are in other media tracks of the media stream and are aligned with the first media slice; or a second media slice that is in the first media track and follows the first media slice; and second parallel media slices that are in the other media tracks of the media stream and are time aligned with the second media slice.

16. The device of claim 15, wherein the characteristic information comprises at least one of:

an offset of the first media slice of the first media track;

a size of the first media slice of the first media track;

an offset of each of the first parallel media slices;

a size of the each of the first parallel media slices;

a quality of the first media slice of the first media track; or a quality of the each of the first parallel media slices.

17. The device of claim 15, wherein, when the processor is configured to cause the device to determine, based on the track switching information, the switch to the different media track at the second media chunk is needed, the processor is configured to cause the device to:

determine, based on the characteristic information and a bandwidth available to the device, the switch to the one of the other media tracks being needed.

18. A non-transitory storage medium for storing computer readable instructions, the computer readable instructions, when executed by a processor in a device, causing the processor to:

receive media stream data of a media stream, wherein the media stream comprises at least two media tracks, wherein the at least two media tracks are Dynamic Adaptive Streaming over HTTP (DASH) standard media tracks or Common Media Application Format (CMAF) media tracks, and wherein the media stream data comprises: a plurality of media chunks including a first media chunk and a second media chunk; and Addressable Resource Index (ARI) information associated with the first media chunk, wherein the ARI information carries offset, size, duration and quality of timed aligned segments or chunks and comprises an ARI event associated with the media stream, and wherein the ARI event is an inband event and is embedded in a first media slice that is in a first media track of the media stream such that the ARI event presents in the first media slice without using a metadata track, wherein the ARI event carries track switching information, and wherein the first media track comprises a media representation;

determine track switching information based on the ARI information;

determine, based on the track switching information and a bandwidth available to the device, a switch to a different media track at the second media chunk is needed; and receive the first media chunk and the second media chunk via respective media track, wherein each of the first media chunk and the second media chunk is delivered to the device with a delivery delay that is no more than one chunk.

* * * * *